April 3, 1956 C. A. WINSLOW ET AL Re. 24,138

LUBRICANT PURIFIER

Original Filed Feb. 13, 1942

INVENTORS
CHARLES A. WINSLOW
LAURENCE L. MOORE
BY
Chas. E. Townsend
ATTORNEY

United States Patent Office

Re. 24,138
Reissued Apr. 3, 1956

24,138

LUBRICANT PURIFIER

Charles A. Winslow and Laurence L. Moore, Oakland, Calif., assignors to Winslow Engineering Co., Oakland, Calif., a partnership consisting of Charles A. Winslow, Catherine B. Winslow, Laurence L. Moore, and William G. Nostrand Original No. 2,345,849, dated April 4, 1944, Serial No. 430,749, February 13, 1942. Application for reissue July 14, 1955, Serial No. 522,191

4 Claims. (Cl. 210—148)

Matter enclosed in heavy brackets [ ] appears in the original patent but forms no part of this reissue specification; matter printed in italics indicates the additions made by reissue.

The present invention relates to oil conditioners and oil purifiers for use particularly with internal combustion engines; this application being a continuation in part of our copending application, Serial Number 258,653, filed February 27, 1939, now Patent No. 2,314,640, issued March 23, 1943.

A particular object of the invention is to provide such an oil conditioning replacement element, suitable to various standard types of oil purifiers. Another object is the provision of an oil conditioning element which is relatively free flowing and flexible, thus providing a construction which permits a maximum flow rate through the element for the purpose of bringing the fluid to be filtered and processed into contact with the materials in the element for the purpose of changing the nature of deleterious substances contained in the lubricating oil, fuel oil or other fluids to be reconditioned and cleaned. A further object is the provision of a flexible hollow casing, preferably of tubular form and composed of knitted materials incasing combined and mixed fibrous and porous materials, such as cotton and wood fibers, into a knitted tube, with a novel means of closing the ends of the filled tube in conjunction with a central, hollow, perforate, rigid supporting member by which the filtering material, packed within the tube, is prevented from collapse.

Referring to the accompanying drawing.

Figure 1:
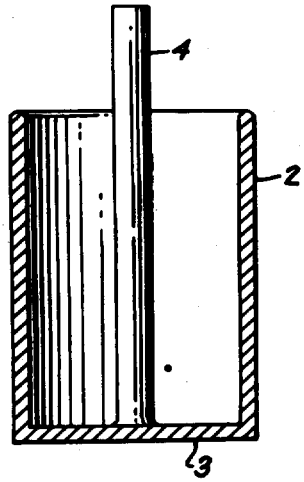
Fig. 1 is a vertical section of a form used in the manufacture of our conditioning element.
Figure 2:
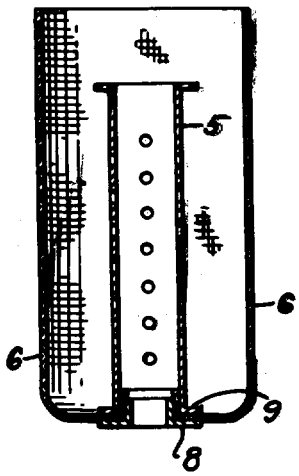
Fig. 2 is a vertical section, illustrating the early stage of constructing our element.
Figure 3:
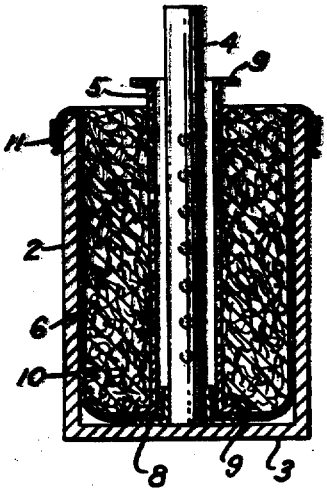
Fig. 3 shows the element in incomplete state in the filling form of Fig. 1, ready for filling.

Referring to the drawing, 2 represents a cylindrical metal cup or hollow form, with a bottom 3 from which springs a central stud 4 coaxial with the cup. 5 is a perforated, flanged tube, substantially the length of the finished article and large enough to be slipped readily over the stud 2. 6 is a porous knitted sleeve of fabric which is slipped over the tube 5, with one end tucked into the tube, as at 7, and tightly held there by means of a flanged hollow stopper or bushing 8 which telescopes with a tight friction fit the tube 5 and clamps the fabric against the flange 9 of the tube 5.

With the fabric thus firmly secured at one end to the tube 5, the latter, with the fabric sleeve, is placed in the form 2, over the stud 4, preparatory to the fabric casing 6 being filled and stuffed with a compacted mass of suitable filtering material, preferably a mixture of cotton waste and wood shavings 10. The fabric sleeve 6 and the tube 5 form between them an annular pocket, when distended, to receive said filtering material. The pocket is held in open position while being filled by means of a spring clamp 11 to form 2 near its upper end. When so filled, the upper and heretofore free end of the fabric is released from clamp 11 and drawn in, compressed and sealed by a second flanged bushing 12, identical with the bushing 8 at the other end of the tube.

The element is then completed and may be removed from the cup 2 and stud 4 and is ready for use. This element is flexible and normally grows in volume as deleterious substances are collected and absorbed within the body of the element. It is thus evident that the exterior surface is expanded and the interior is compressed at the core. Experience has taught us that this action is best obtained by causing the oil to flow from the entire exposed exterior surface of the element toward a common center. In this case the growing action which causes swelling of the element body naturally opens up the porosity on the exterior surface which not only prevents clogging of the outside surface but also continually presents new exposed surfaces of the unused chemically treated purifying materials within the body of the element itself.

The element as thus completed consists of a cylindrical structure of a predetermined compacted mass of filtering material surrounding a rigid hollow perforated support which is open from end to end.

Wherein in our earlier application, above referred to, we have stressed a conditioning element employing two plies of fabric, in the present instance it is noted that we have a single ply which for certain conditions is found to be ample.

Figure 5:
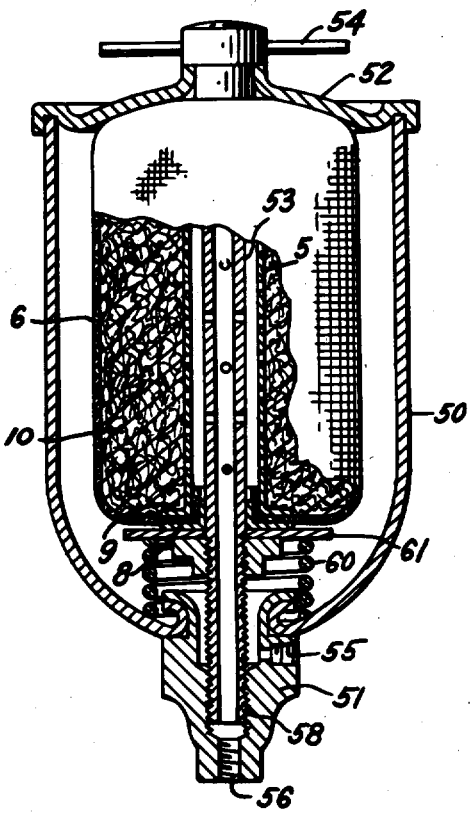
Fig. 5 illustrates, in partial section, a suitable container for the present invention, the latter being shown in partial section to denote the mode of use.
Figure 4:
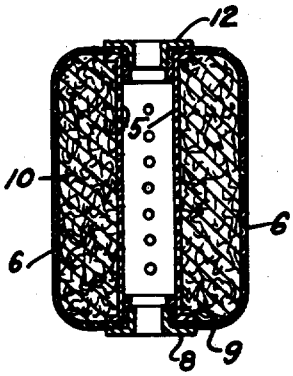
Fig. 4 is a vertical, central section of the completed element constituting the present invention.

The mode of use is illustrated in Fig. 5, in which 50 indicates a suitable container in the form of a cylindrical shell with a bottom fitting 51. 52 designates a removable cover, held in place by a central hollow stud 53, to which is attached a handle 54. An oil inlet 55 and an outlet 56 are provided in the fitting 51 which also provides a threaded portion 58, into which the hollow central stud 53 is threaded. A spring 60 is provided which insures an even upward pressure on the washer 61 below the element 62 which constitutes the invention above described. In some installations it is desirable to screw the hollow stud 53 rigidly into the bottom fitting 51 and screw off the handle part 54 to remove the cover when changing elements. In other cases it may be desirable to attach rigidly the handle part 54 to the central tube and unscrew the assembly from the bottom fitting 51 when changing elements. In either case the compression spring 60 kicks out the used element when the cover is removed.

With the filtering element housed in such a container, it is always clear of the shell and also free of sludge during its normal life. It will be above the shell and can come out free when the cover is removed. In view of the fact that the novel structure of the element actually grows or expands in service and also since common crankcase sludge, when broken down into its simpler forms of materials, occupies considerable less space, the element is many times greater in both clean-up rate and long life.

What we claim is:

[1. An oil conditioner element comprising a cylindrical body with a central, cylindrical, hollow, rigid, perforate core, a tubular fabric casing having its ends secured to corresponding ends of the core, the ends of the fabric casing passing over the respective ends of the core, the means for securing said ends of the tubular fabric comprising plugs for frictionally holding the fabric against the interior of the core, and a compacted mass of filtering material within the space enclosed between the casing and core, at least one of said plugs being hollow to afford communication with the interior of the core.]

[2. An oil conditioner element comprising a cylindrical tubular fabric casing, a compacted mass of filtering material within the tubular fabric casing, the casing enclosing only the outside exposed peripheries of the element, a hollow, central, rigid, perforate core extending longitudinally within the element, the ends of the tubular fabric casing being tucked into the respective ends of the core, and a hollow stopper member telescoping each end of the core and clamping the ends of the fabric casing against the core, the elements being open from end to end through the core and said stopper members.]

[3. An oil conditioner element comprising an inside perforated core member, an outer pervious casing member, the ends of the casing member passing over respective ends of the core member, a cylindrical mass of filtering material enclosed in the space between said members, and plugs frictionally fitting the ends of the core member to clamp the casing member in place and maintain the parts as a unitary structure, at least one of said plugs having a central hole through it in axial line with the said core member.]

*4. An oil conditioner element comprising a cylindrical body with a central, cylindrical, hollow, rigid, perforate core, a porous knitted sleeve of fabric whose openings become enlarged upon its expansion, said casing having its ends secured to corresponding ends of the core, the ends of the fabric casing passing over the respective ends of the core, the means for securing said ends of the tubular fabric comprising plugs for frictionally holding the fabric against the interior of the core, and a compacted mass of filtering material within the space enclosed between the casing and core, at least one of said plugs being hollow to afford communication with the interior of the core, whereby the deposit in said mass of foreign substances carried in the fluid being filtered will cause said mass to grow and said growth will enlarge the openings in said casing as the latter is expanded.*

*5. An oil conditioner element comprising a cylindrical tubular expansible porous knitted fabric casing with openings which become enlarged upon its expansion, a compacted mass of filtering material within the tubular fabric casing, having the characteristic of growing as it receives in its interstices particles extracted from the fluid passing through it, the casing enclosing only the outside exposed peripheries of the element, a hollow, central, rigid, perforate core extending longitudinally within the element, the ends of the tubular fabric casing being tucked into the respective ends of the core, and a hollow stopper member telescoping each end of the core and clamping the ends of the fabric casing against the core, the element being open from end to end through the core and said stopper members, whereby growth of said mass will cause it to expand outwardly thus enlarging the openings in said casing.*

*6. An oil conditioner element comprising an inside perforated core member, an outer pervious knitted expansible casing member, the ends of the casing member passing over respective ends of the core member, a cylindrical mass of filtering material enclosed in the space between said members having the characteristic of growing upon the deposit therein of foreign substances, and plugs frictionally fitting the ends of the core member to clamp the casing member in place and maintain the parts as a unitary structure, at least one of said plugs having a central hole through it in axial line with the said core member whereby the deposit in said mass of said foreign substances carried in the fluid being filtered will cause said mass to grow and said growth will enlarge the pores in said expansible casing as the latter is expanded.*

*7. An oil conditioner element comprising a cylindrical body with a central, cylindrical, hollow, rigid, perforate core, a pervious tubular fabric casing of knit material having its ends secured to corresponding ends of the core, the ends of the fabric casing passing over the respective ends of the core, the means for securing said ends of the tubular fabric comprising plugs for frictionally holding the fabric against the interior of the core, and a compacted mass of filtering material within the space enclosed between the casing and core, at least one of said plugs being hollow to afford communication with the interior of the core, whereby the deposit in said mass of foreign substances carried in the fluid being filtered will cause said mass to grow and said growth will enlarge the openings in said casing as the latter is expanded.*

References Cited in the file of this patent or the original patent

UNITED STATES PATENTS

| | | |
|---|---|---|
| 1,145,372 | Krause | July 6, 1915 |
| 2,134,385 | Winslow | Oct. 25, 1938 |
| 2,153,062 | Harlan et al. | Apr. 4, 1939 |
| 2,168,125 | Hurn | Aug. 1, 1939 |
| 2,203,815 | Dahl et al. | June 11, 1940 |
| 2,265,471 | Burhans | Dec. 9, 1941 |